(12) United States Patent
Sakai et al.

(10) Patent No.: US 7,099,819 B2
(45) Date of Patent: Aug. 29, 2006

(54) TEXT INFORMATION ANALYSIS APPARATUS AND METHOD

(75) Inventors: Tetsuya Sakai, Kanagawa-ken (JP); Masaru Suzuki, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 911 days.

(21) Appl. No.: 09/906,694

(22) Filed: Jul. 18, 2001

(65) Prior Publication Data

US 2002/0016798 A1    Feb. 7, 2002

(30) Foreign Application Priority Data

Jul. 25, 2000    (JP)    ............... 2000-224063

(51) Int. Cl.
*G06F 17/20*    (2006.01)

(52) U.S. Cl. ............... 704/1; 704/5; 706/12; 706/20; 709/206

(58) Field of Classification Search ............... 704/1, 704/5; 706/20, 12; 709/206
See application file for complete search history.

(56) References Cited

U.S. PATENT DOCUMENTS

| | | | | |
|---|---|---|---|---|
| 5,675,710 A | * | 10/1997 | Lewis | 706/12 |
| 5,687,364 A | * | 11/1997 | Saund et al. | 704/5 |
| 6,047,277 A | * | 4/2000 | Parry et al. | 706/20 |
| 6,137,911 A | * | 10/2000 | Zhilyaev | 382/225 |
| 6,161,130 A | * | 12/2000 | Horvitz et al. | 709/206 |
| 6,233,575 B1 | * | 5/2001 | Agrawal et al. | 707/6 |
| 6,463,430 B1 | * | 10/2002 | Brady et al. | 707/3 |
| 2002/0002450 A1 | * | 1/2002 | Nunberg et al. | 704/1 |

FOREIGN PATENT DOCUMENTS

| | | |
|---|---|---|
| JP | 8-241323 | 9/1996 |
| JP | 10-154150 | 6/1998 |

OTHER PUBLICATIONS

Mohammed Benkhalifa et al. "Text Categorization using the Semi-Supervised Fuzzy c-Means Algorithm", 0-7803-5211-4/99. Fuzzy Information Processing Society, 1999 IEEE.*
S.E. Robertson et al., "Simple, proven approaches to text retrieval," Computer Laboratory, University of Cambridge, May 1997, pp. 1-7.
H.C. Romesburg, "Cluster Analysis for Researchers," Lifetime Learning Publications, 1984, title page, copyright page, and pp. v-x and 14-23.

* cited by examiner

*Primary Examiner*—Richemond Dorvil
*Assistant Examiner*—Qi Han
(74) *Attorney, Agent, or Firm*—Finnegan, Henderson, Farabow, Garrett & Dunner, L.L.P.

(57) ABSTRACT

Text information analysis apparatus arranges a plurality of texts according to the content of each text. In the text information analysis apparatus, a category decision unit classifies text to one of a plurality of predetermined categories. A cluster generation unit clusters texts having similar contents from the plurality of texts. A control unit controls the category decision unit and the cluster generation unit to simultaneously execute a category decision and clustering for the plurality of texts.

22 Claims, 17 Drawing Sheets

| CATEGORY | CATEGORY DECISION RULE |
|---|---|
| CATEGORY 1 | < WORD 1 >,< WORD 2 >,< WORD 3 > |
| CATEGORY 2 | < WORD 4 >,< WORD 5 > |
| ⋮ | ⋮ |
| CATEGORY N | < WORD 1 >,< WORD 6 >,< WORD 7 > |

FIG.3

WORDS APPEARED IN TEXT 1~m

| | < WORD 1 > | < WORD 2 > | < WORD 3 > | ---- | < WORD n > |
|---|---|---|---|---|---|
| TEXT 1 | 0 | 1 | 1 | ----- | 1 |
| TEXT 2 | 1 | 0 | 0 | ----- | 1 |
| TEXT 3 | 0 | 0 | 1 | ----- | 0 |
| TEXT m | 1 | 1 | 0 | ----- | 0 |

FIG.7

TEXT INFORMATION ANALYSIS APPARATUS AND METHOD

CROSS-REFERENCE TO RELATED APPLICATIONS

This application is based upon and claims the benefit of priority from the prior Japanese Patent Application PH2000-224063, filed on Jul. 25, 2000; the entire contents of which are incorporated herein by reference.

FIELD OF THE INVENTION

The present invention relates to a text information analysis apparatus and a method for arranging a plurality of texts according to the content of each text.

BACKGROUND OF THE INVENTION

Recently, in proportion to the increase in electrical text information, a text information analysis technique to classify or arrange a plurality of texts according to the content of each text attracts a user's attention. The text information analysis technique includes a text classification technique (categorization/classification) and a text clustering technique. In the text classification technique, N units of categories are previously determined and each text is classified to at least one of the plurality of texts. In the text clustering technique, categories are not previously determined, a similarity degree between texts is determined, and a plurality of texts are classified to arbitrary units according to the similarity degree.

In the text classification technique, suitability between each text and N units of categories is decided. Accordingly, the processing of each text comprises N steps and relatively executed at high speed. However, if the content of the text is not similar to a feature of one category, the text is not classified. Especially, in case that new text content occurs daily, i.e., if tendency of text content changes daily, classification using predetermined categories is often impossible. In this case, it is necessary that a new category is set automatically or by hand.

On the other hand, in the text clustering technique, the content of the text drives the analysis. Accordingly, this technique is effective for text with unknown content. However, in general, the computational cost is enormous. In case of clustering of m units of text, a similarity degree between each pair of texts in m units of text is calculated and processing steps of a square of m is necessary.

In a text information analysis system, only one of the text classification technique and the text clustering technique is used. However, both techniques include defects. On the other hand, a large number of unknown texts appear daily. The unknown texts are not always classified to a predetermined category. Accordingly, it is difficult to satisfy actual needs that the unknown texts are quickly classified and arranged.

SUMMARY OF THE INVENTION

It is an object of the present invention to provide a text information analysis apparatus and a method to quickly classify and arrange a plurality of unknown texts.

According to embodiments of the present invention, there is provided a text information analysis apparatus for arranging a plurality of texts according to the content of each text, comprising: a category decision unit configured to classify text to one of a plurality of predetermined categories; a cluster generation unit configured to cluster texts having similar contents from the plurality of texts; and a control unit configured to control said category decision unit and said cluster generation unit to simultaneously execute a category decision and clustering for the plurality of texts.

Further in accordance with embodiments of the present invention, there is also provided a text information analysis method for arranging a plurality of texts according to the content of each text, comprising: classifying text to one of a plurality of predetermined categories; clustering texts having similar contents from the plurality of texts, and simultaneously executing a category decision and clustering for the plurality of texts.

Further in accordance with embodiments of the present invention, there is also provided a computer program product for use with a computer, said computer program product comprising: a computer usable medium having computer readable program code embodied in said medium for causing said computer to arrange a plurality of texts according to the content of each text, said computer readable program code having: computer readable program code to classify text to one of a plurality of predetermined categories; computer readable program code to cluster texts having similar contents from the plurality of texts; and computer readable program code to simultaneously execute a category decision and clustering for the plurality of texts.

BRIEF DESCRIPTION OF THE DRAWINGS

FIG. 3 is a schematic diagram of one example of a category decision rule according to embodiments of the present invention.

FIG. 7 is a schematic diagram of bit vector of words for clustering according to embodiments of the present invention.

DETAILED DESCRIPTION OF THE EMBODIMENTS

Figure 1:
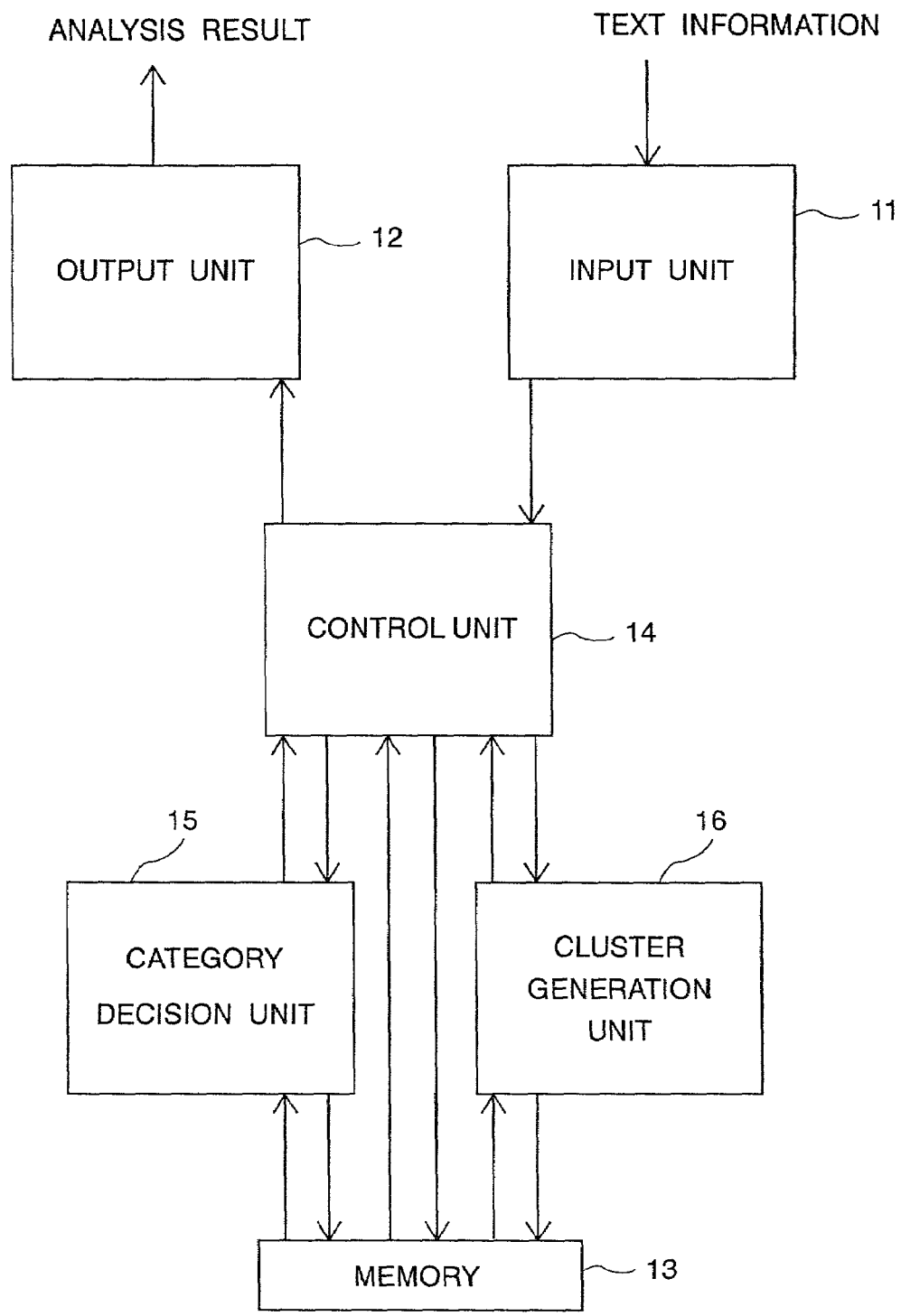
FIG. 1 is a block diagram of a text information analysis apparatus according to various embodiments of the present invention.

Hereinafter, embodiments of the present invention will be explained by referring to the drawings. FIG. 1 is a block diagram of a text information analysis apparatus according to various embodiments of the present invention. In FIG. 1, an arrow represents data flow. The text information analysis apparatus includes an input unit 11, an output unit 12, a memory 13, a control unit 14, a category decision unit 15, and a cluster generation unit 16. The input unit 11 and the output unit 12 correspond to a user interface of the computer. As for the hardware, the input unit 11 is an input apparatus such as a keyboard or a mouse, and the output unit 12 is an output apparatus such as a display. In comparison with a text information analysis of the prior art, the text information analysis apparatus shown in FIG. 1 especially includes both the category decision unit 15 and the cluster generation unit 16, and the control unit 14 controls both units 15, 16.

Figure 2:
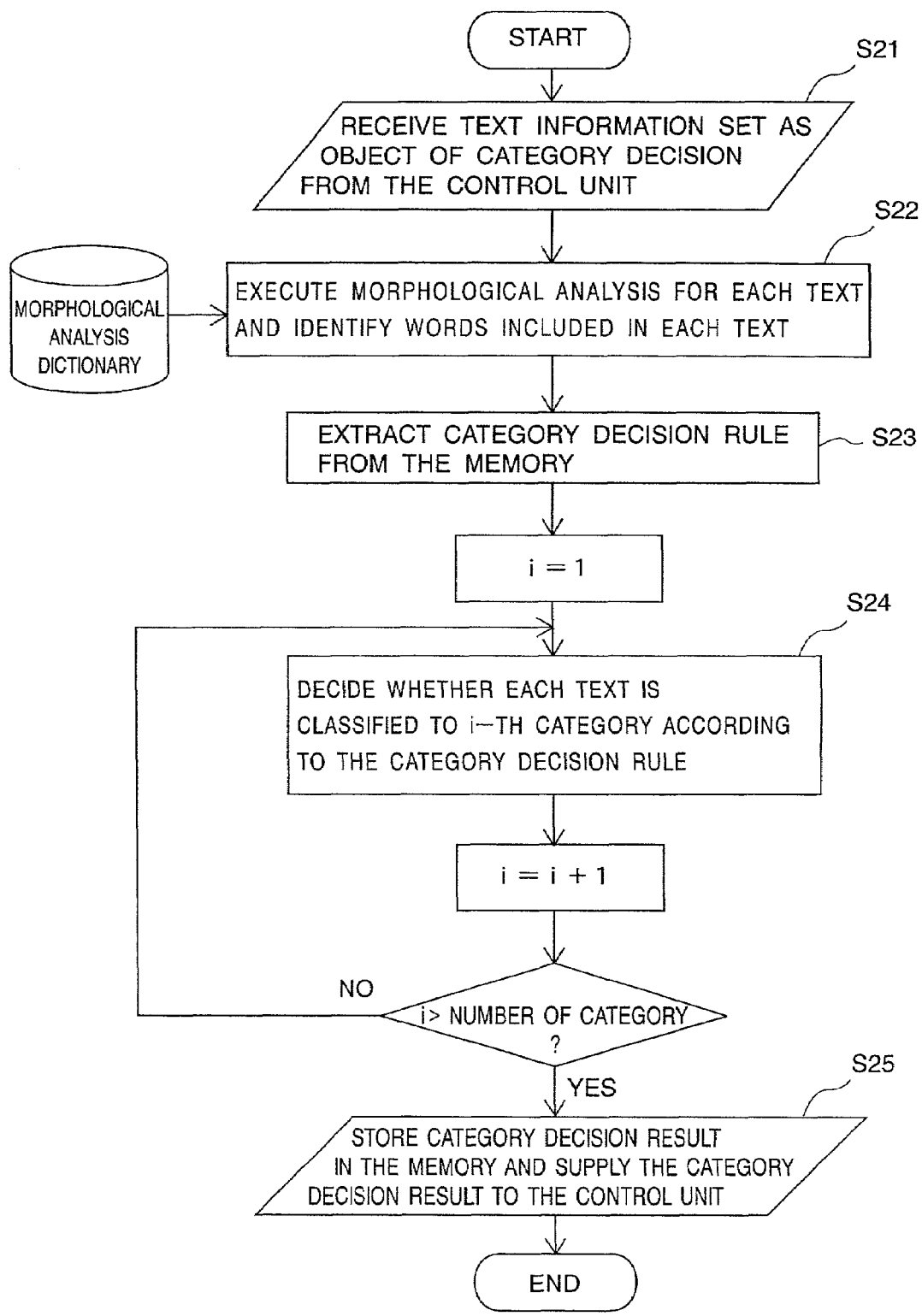
FIG. 2 is a flow chart of processing of a category decision unit 15 according to embodiments of the present invention.

FIG. 2 is a flow chart of processing of the category decision unit 15 according to embodiments of the present invention. When the category decision unit 15 receives text information set as an object of category decision from the control unit 14 (S21), the category decision unit 15 executes a morphological analysis for each text and identifies words included in each text (S22). Next, the category decision unit 15 extracts category decision rules from the memory 13 (S23). The category decision rules will be explained afterwards. Then, as for each category, the category decision unit 15 decides whether each text is classified to a category according to the category decision rule (S24). The category decision unit 15 then stores a category decision result in the memory 13 and supplies the category decision result to the control unit 14 (S25). The category decision result represents that each text is classified to which category.

Figure 4:
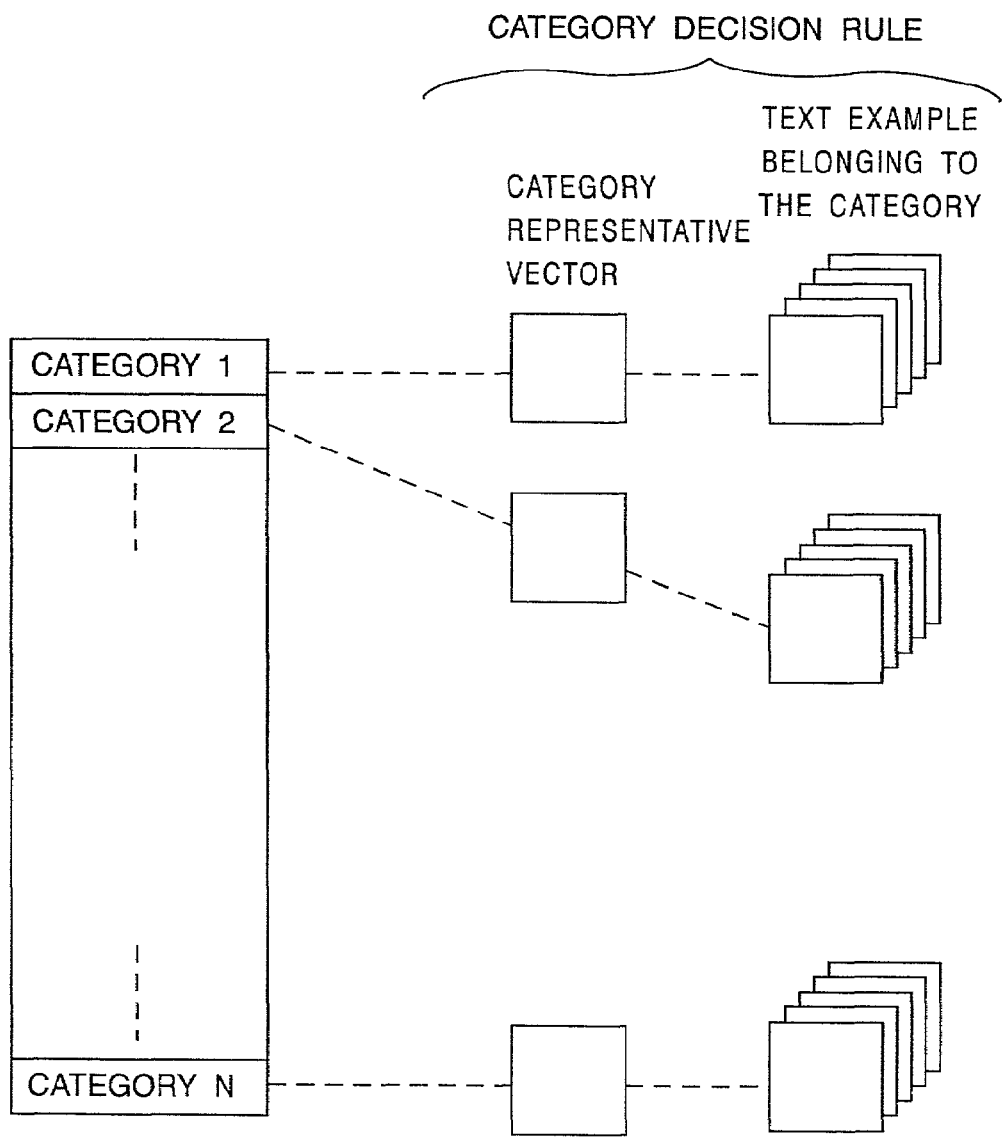
FIG. 4 is a schematic diagram of another example of the category decision rule according to embodiments of the present invention.

FIGS. 3 and 4 show examples of components of the category decision rules. In FIG. 3, at least one keyword is previously assigned to each category of N units. In this example, a set of keywords corresponds to the category decision rule. By using the category decision rule, a problem that some text is classified to which category is easily decided. For example, if the text includes a predetermined number of keywords, the text is classified to the category including the keyword. In the example of FIG. 3, category 1 and category N respectively include a keyword <WORD 1>. However, in case of the text including keywords <WORD 1> <WORD 2> <WORD 6>, the text may be classified to both category 1 and category N.

Figure 5:
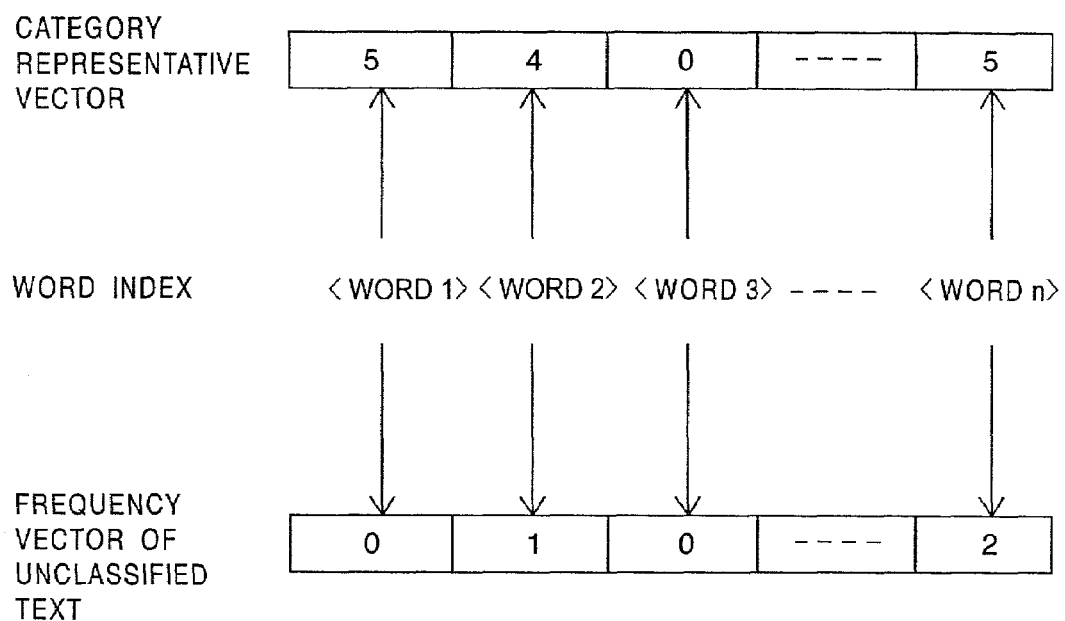
FIG. 5 is a schematic diagram of matching a word between a category representative vector and a frequency vector of unclassified that text according to embodiments of the present invention.

In FIG. 4, at least one example (training data) of text information is assigned to each category of N units. For example, each word is extracted from each text by morphological analysis, a frequency vector of each word is calculated for all texts, and an average of the frequency vector of each word is calculated for one text. In this way, a representative vector corresponding to a representative text of the category is obtained. By using the category decision rule, some unclassified text is classified to a category. First, each word is extracted from the unclassified text by morphological analysis, and a frequency vector for the same word is calculated. Next, as shown in FIG. 5, a similarity degree between the frequency vector and the representative vector of each category is calculated by unit of the same word index (word 1, 2, . . . , n). If a sum of similarity degrees of all word indexes for one category is above a threshold, the unclassified text is classified to the one category. As for the similarity degree, the inner product or the cosine between the frequency vector and the representative vector is utilized. In FIG. 4, the text examples (training data), the category representative vector, and the threshold correspond to the category decision rule. As mentioned-above, in FIGS. 3 and 4, concrete examples of the category decision rule and category decision algorithm are shown. However, the category decision algorithm is not limited to this example. In case of a category decision, any algorithm of text classification may be used.

Figure 6:
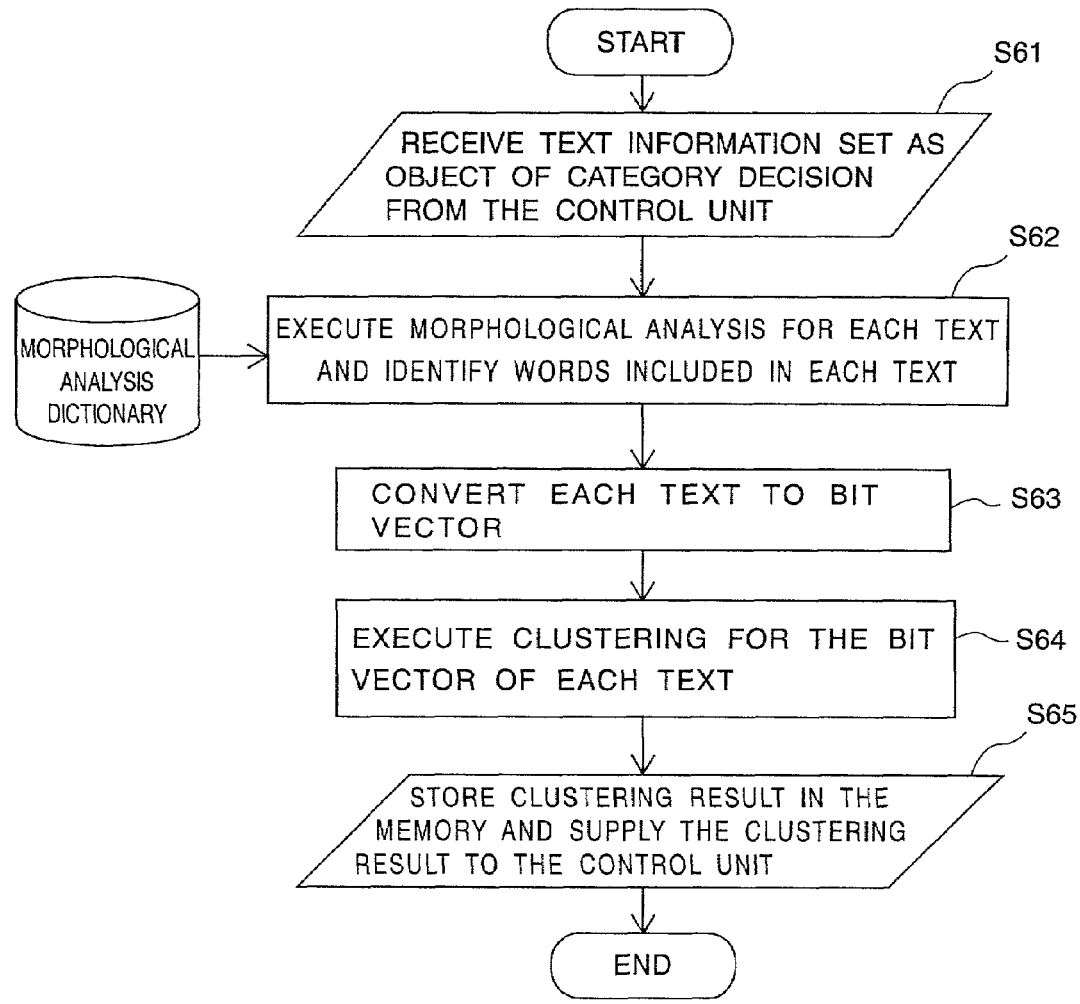
FIG. 6 is a flow chart of processing of a cluster generation unit 16 according to embodiments of the present invention.

FIG. 6 shows one example of a flow chart of processing of the cluster generation unit 16 according to the first embodiment. When the cluster generation unit 16 receives text information set of clustering object from the control unit 14 (S61), the cluster generation unit 16 executes morphological analysis for each text and identifies each word included in the text (S62). Then, each text is converted to a bit vector of words as shown in FIG. 7. In this example, m units of texts are objects of clustering and the number of different words extracted from all texts is n. Accordingly, an n-dimensional vector is composed. In FIG. 7, text 1 includes <WORD 2> <WORD 3> . . . <WORD n>. The cluster generation unit 16 generates clusters from a set of bit vectors as an object (S64). For example, as the clustering method, UPGMA method (group average method) disclosed in "Cluster analysis of instances, H. C. Romesburg, ISBN 4-7536-0116-1 C 3041" is used. The clustering result is then stored in the memory 13 and supplied to the control unit 14 (S65). In the first embodiment, the clustering algorithm is not limited to the flow chart in FIG. 6.

Figure 8:
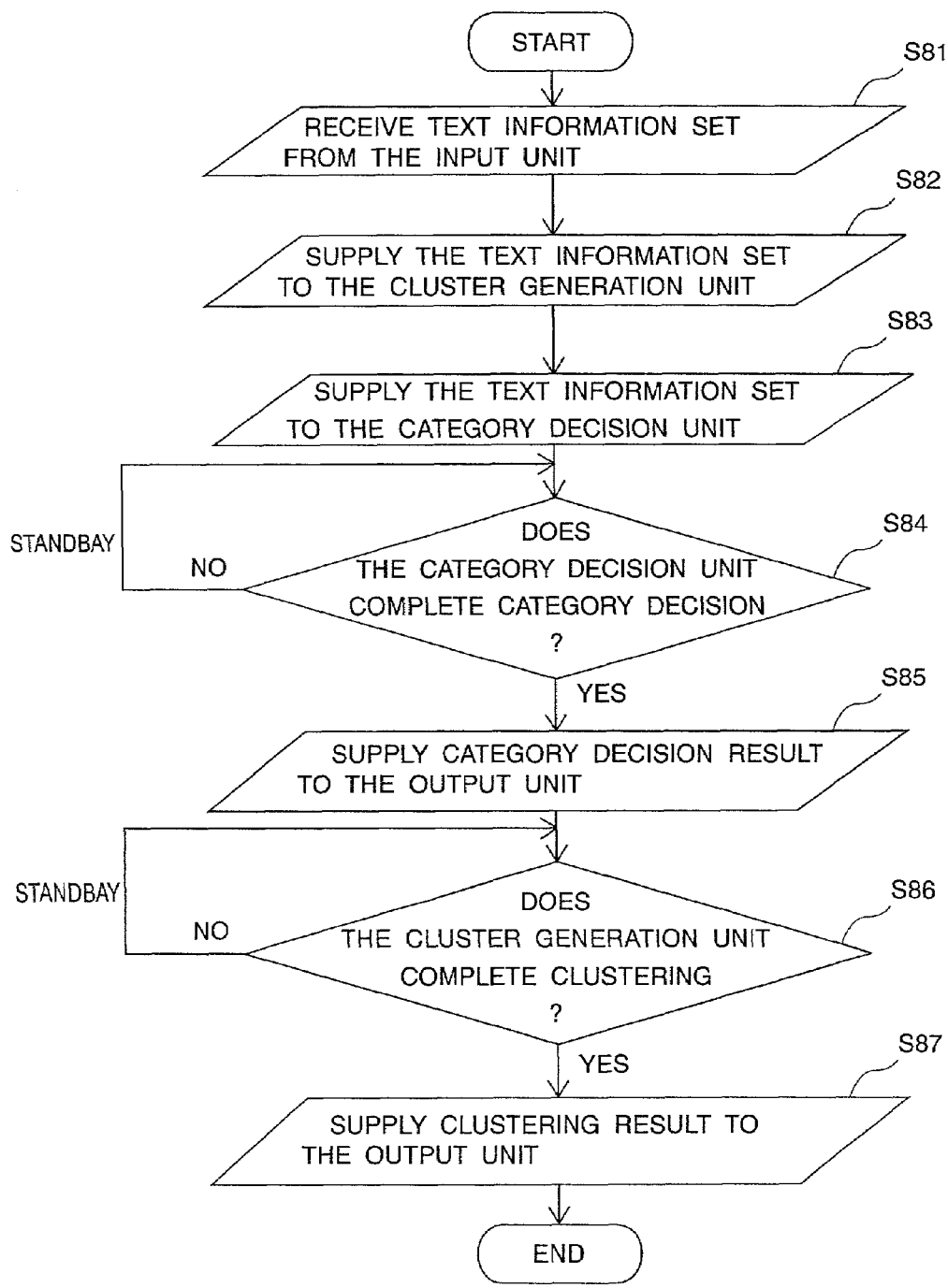
FIG. 8 is a flow chart of processing of a control unit 14 according to a first embodiment of the present invention.

FIG. 8 is one example of a flow chart of processing of the control unit 14 according to the first embodiment. First, the control unit 14 receives text information set as analysis object from the input unit 11 (S81). Next, the control unit 14 supplies the text information set to the cluster generation unit 16 and the category decision unit 15 (S82, S83). Then, when the category decision processing is completed (S84), the category decision result is output through the output unit 12 (S85). In the same way, when the clustering processing is completed (S86), the clustering result is output through the output unit 12 (S87). A specific point of the first embodiment is control to execute the category decision and the clustering for the same text information set. In general, as for the text information of the same volume, the clustering takes much more time than the category decision. This time difference increases in proportion to the amount of text information. Accordingly, for example, in case that the control unit 14 begins the category decision processing and the clustering processing at the same time, the category decision result is obtained faster than the clustering result. In this case, in the first embodiment, while the clustering result continues in the background, a user can watch and analyze the category decision result. In short, the wait time is effectively utilized. Furthermore, when both the category decision result and the clustering result are obtained, the user can compare the category decision result with the clustering result.

Figure 9:
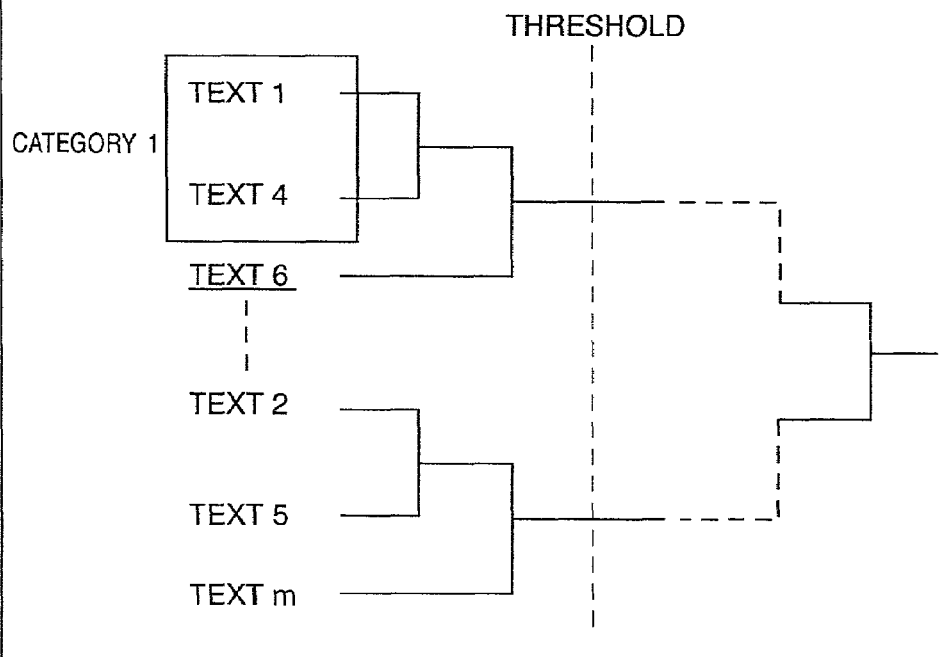
FIG. 9 is a schematic diagram of one example of a display of a category decision result and a clustering result according to the first embodiment of the present invention.

FIG. 9 is one example of a screen display for comparatively displaying the category decision result and the clustering result for the same text information. In this example, text 1~m classified to categories 1~N and unclassified text 6 are shown at <<category decision result>>. In addition to this, a hierarchical clustering result of text 1~m is shown at <<clustering result>>. In this case, the unclassified text 6 is discriminately displayed at <<category decision result>>. In short, a correspondence relation of text between the category decision result and the clustering result is shown. The text to be discriminately displayed is not limited to the text unclassified to a category. For example, in case of selecting text 1 in the category decision result of FIG. 9, the text 1 may be discriminately displayed in the clustering result. Conversely, by selecting the text 1 in the clustering result, the text 1 may be discriminately displayed in the category decision result. Furthermore, in <<clustering result>> of FIG. 9, text 1 and text 4 of the same cluster is classified to category 1. In this way, when the user selects a specified category in the category decision result, all texts classified to the specified category are discriminately displayed. As a result, correspondence between the category decision result and the clustering result is clearer. Conversely, for example, when the user selects a cluster including texts 1, 4, 6 in the clustering result of FIG. 9, the texts 1, 4, 6 in the category decision result may be discriminately displayed.

In FIG. 9, the text 6 is not classified to any category in the category decision result. In the clustering result, it is apparent that the text 6 relates to texts 1, 4 based on the content. In the category decision result, texts 1, 4 are classified to category 1. Accordingly, it is assumed that the content of the text 6 is similar to category 1. Hereinafter, in order to classify the text 6 to category 1, the content of the text 6 is used to correct the category decision rule of category 1. For example, in the category decision rule of FIG. 3, keyword of category 1 is <WORD 1> <WORD 2> <WORD 3>. If the text 6 includes <WORD 1> <WORD 8>, <WORD 8> is added to category 1 as a new keyword. Hereinafter, in FIG. 9, the text 6 is classified to category 1. Furthermore, in FIG. 9, if many texts unclassified to every category exist and they form one cluster, the user may set a new category including the many texts. As mentioned-above, a comparison display of the category decision result and the clustering result is helpful to modify and set categories in order to avoid commonplace categories.

Next, the second embodiment of the present invention is explained. The component of the second embodiment, and processings of the category decision unit 15 and the clustering unit 16 are the same as the first embodiment. Hereafter, processing of the control unit 14 is explained.

Figure 10:
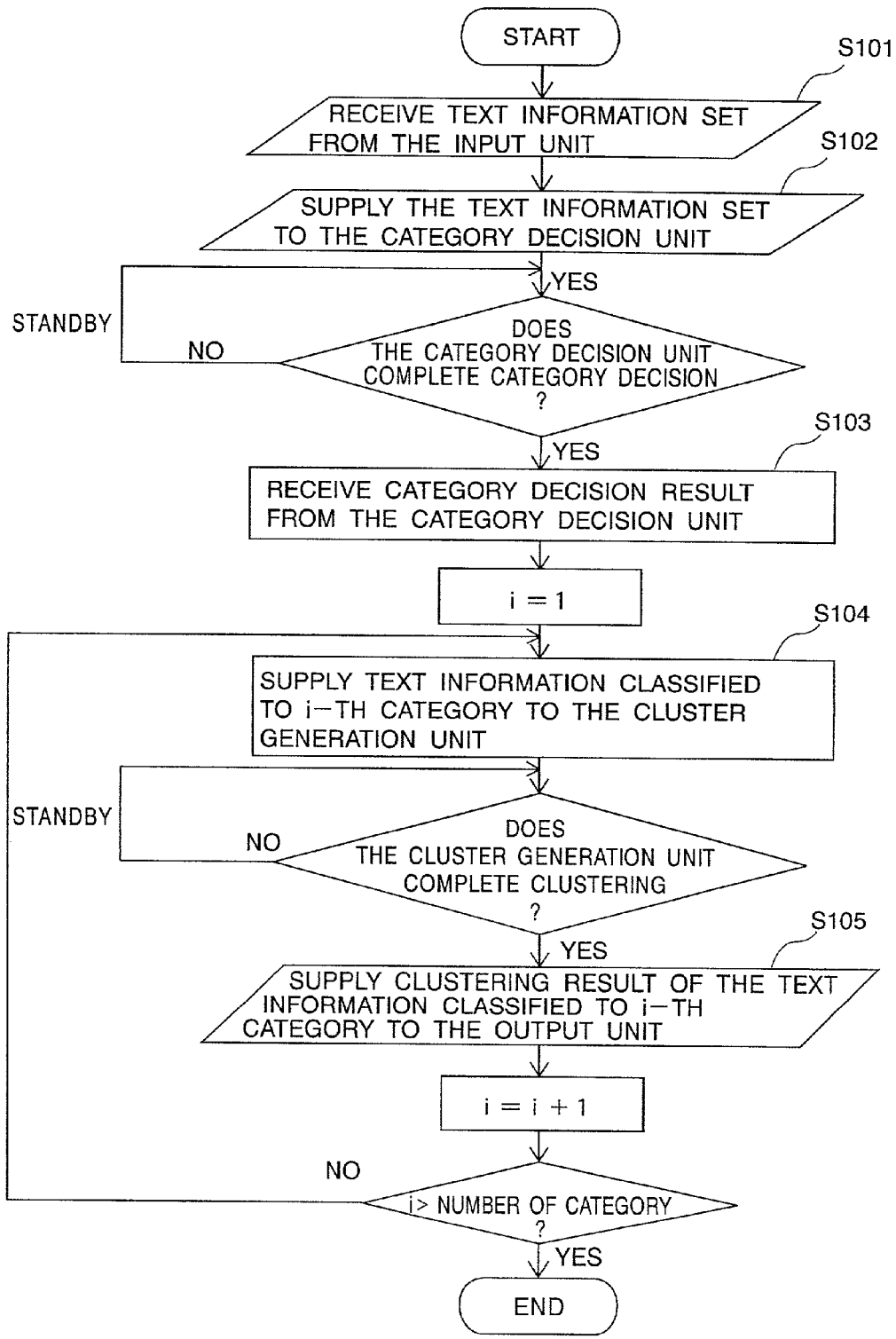
FIG. 10 is a flow chart of processing of the control unit 14 according to a second embodiment of the present invention.
Figure 11:
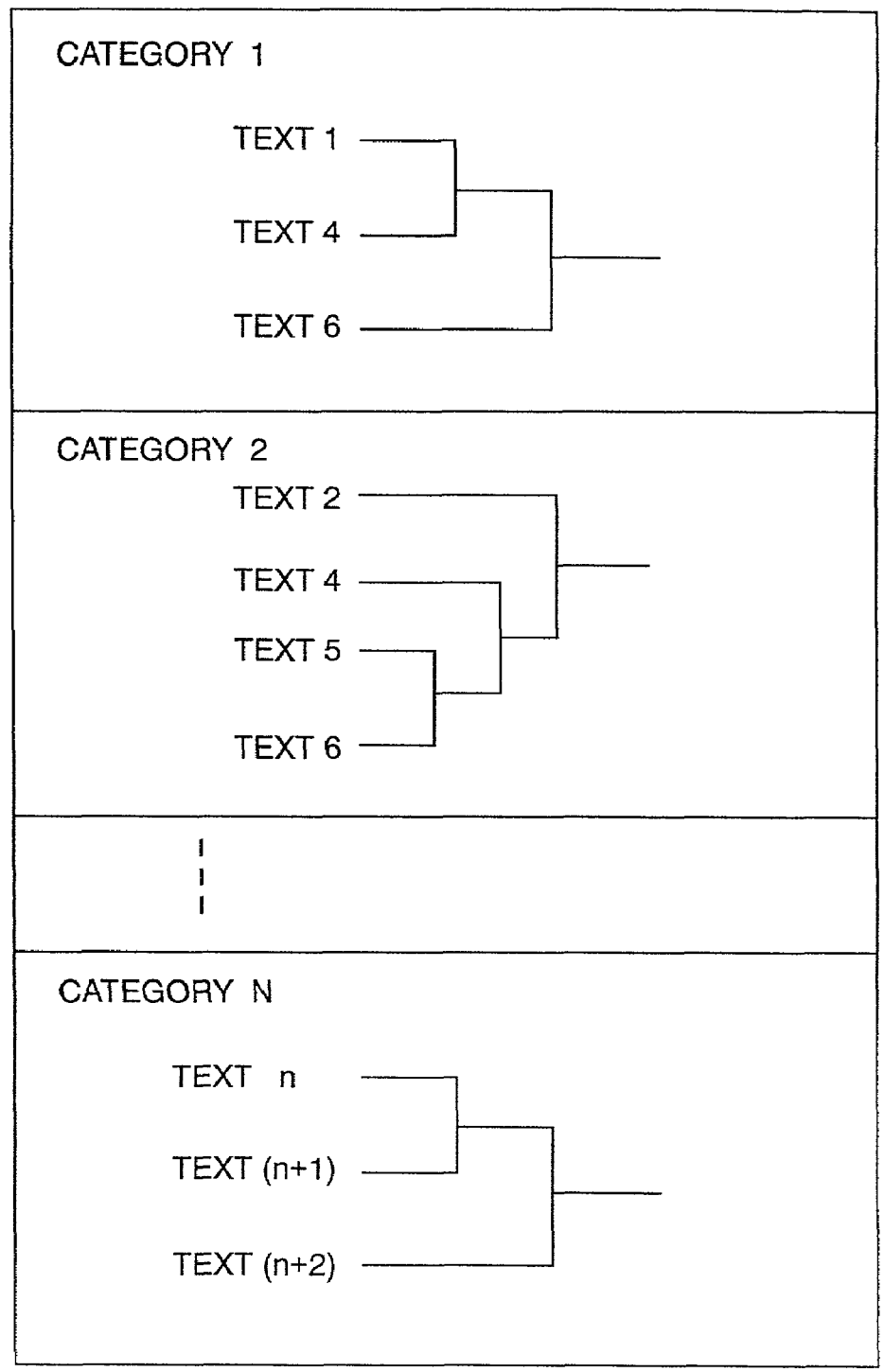
FIG. 11 is a schematic diagram of one example of a display of a clustering result for each category according to the second embodiment of the present invention.

FIG. 10 is a flow chart of processing of the control unit 14 according to the second embodiment. First, when the control unit 14 receives a text information set from the input unit 11 (S101), the control unit 14 supplies the text information set to the category decision unit 15 (S102), and receives the category decision result from the category decision unit 15 (S103). Next, the control unit 14 supplies text information classified to each category to the cluster generation unit 16 in order (S104). In short, N units of text set classified to category 1~N are respectively clustered (S105). For example, assume that the number N of category is 10 and the number m of texts is 1000. In case of clustering for these texts, in general, calculation of steps of a square of "1000" ($10^6$) is necessary. On the other hand, in the second embodiment, the text information set is previously divided into ten units of subspaces, and each subspace is consisted of almost "100" units of texts. Accordingly, calculation steps are reduced as a square of "100" multiplying ten times ($100^2 \times 10 = 10^5$). FIG. 11 shows one display example of the clustering result of each category 1~N according to the second embodiment.

Next, the third embodiment of the present invention is explained. The component of the third embodiment, and processings of the category decision unit 15 and the clustering unit 16 are the same as in the first embodiment. Hereafter, processing of the control unit 14 is explained.

Figure 12:
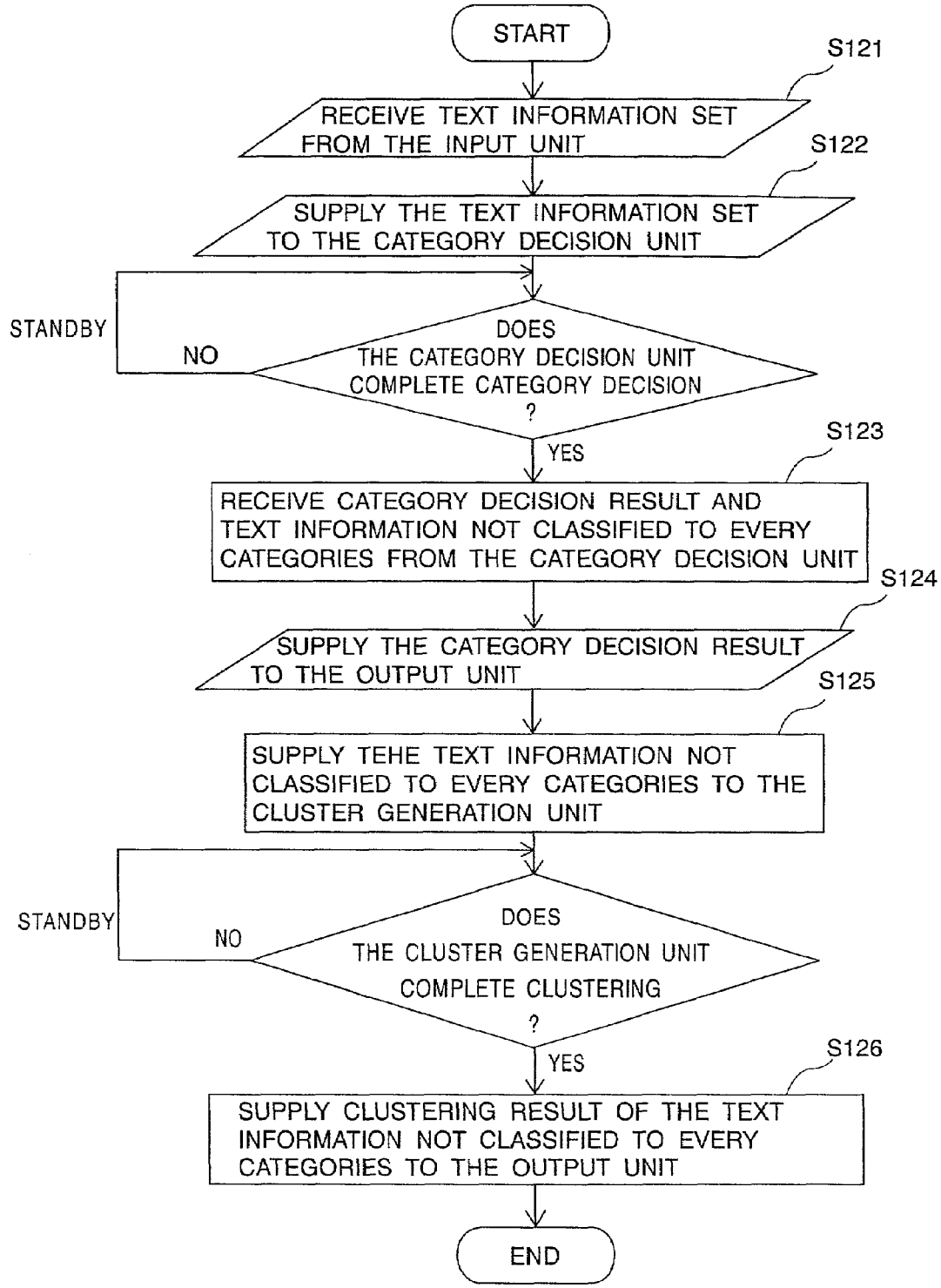
FIG. 12 is a flow chart of processing of the control unit 14 according to a third embodiment of the present invention.

FIG. 12 is a flow chart of processing of the control unit 14 according to the third embodiment. First, when the control unit 14 receives a text information set from the input unit 11 (S121), the control unit 14 supplies the text information to the category decision unit 15 (S123), and receives the category decision result from the category decision unit 15 (S124). As a result, the control unit 14 extracts text unclassified to any category and supplies the text to the cluster generation unit 16 (S125). In the same way as in the second embodiment, this processing is related with reduction of the number of texts as clustering object. Accordingly, the computational cost is reduced (S126).

As a status that some text is not classified to any category, in the category decision rule of FIG. 3, a case that the text does not include a predetermined number of keywords of any category is considered. In the same way, in the category decision rule of FIG. 4, a case that a similarity degree between word-frequency vector of word and representative vector of each category is below a threshold is considered. These texts are not classified to the existing category, and may include new content.

Figure 13:
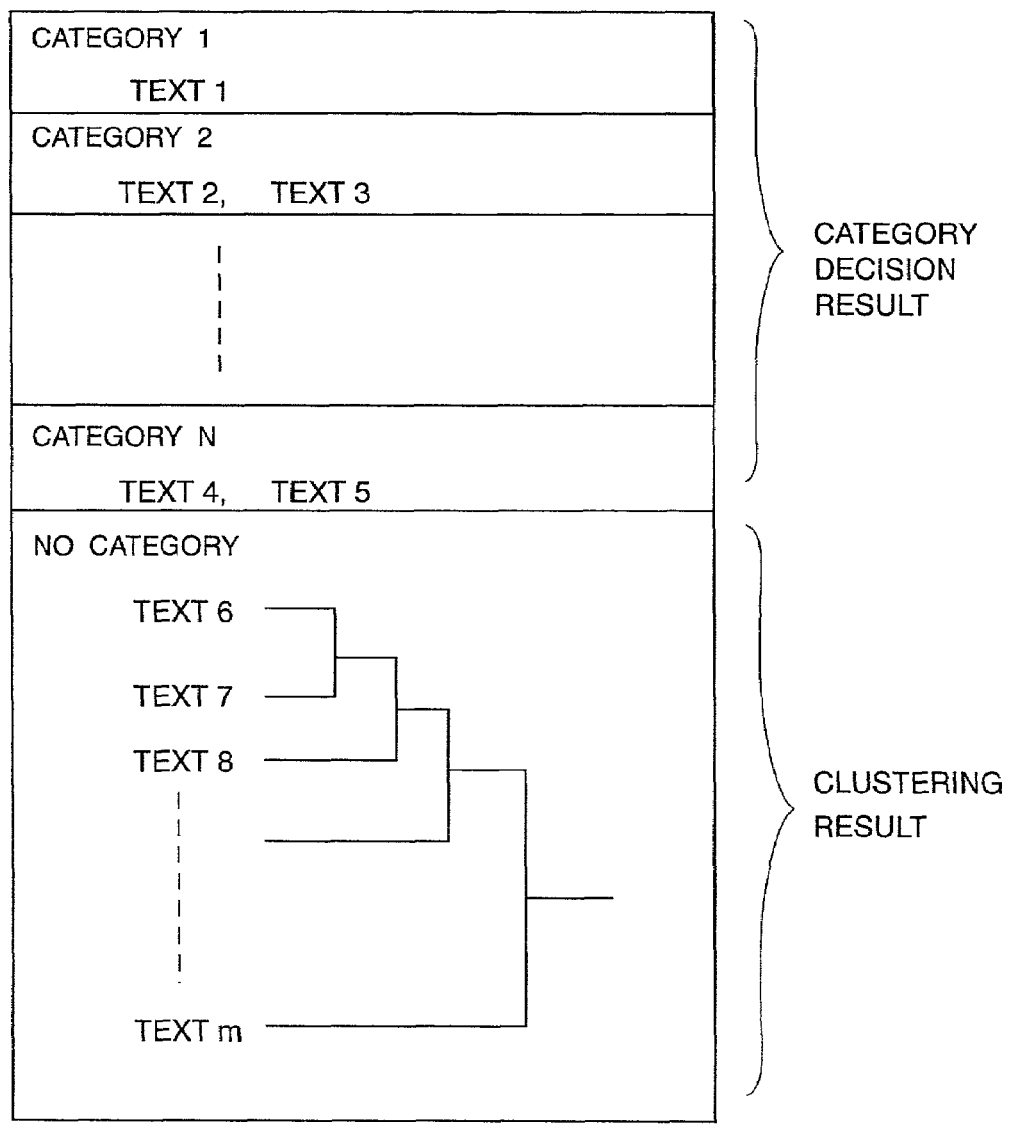
FIG. 13 is a schematic diagram of one example of a display of the category decision result and the clustering result according to the third embodiment of the present invention.

FIG. 13 shows a display example of the category decision result and the clustering result according to the third embodiment. In this example, the clustering result of texts unclassified to every category is only displayed. In this case, if a cluster consisting of a large number of texts is displayed, the user can set a new category to which this cluster is classified.

Next, the fourth embodiment of the present invention is explained. The processing of the fourth embodiment is executed by combining the processings of the first, second, and third embodiments. As a specific feature of the fourth embodiment, the category decision rule is automatically corrected using the clustering result. Accordingly, in addition to control of the category decision processing and the clustering processing shown in the first, second, and third embodiments, after this processing, the control unit 14 corrects the category decision rule using the clustering result at arbitrary timing. Hereafter, this correction processing of the control unit 14 is explained.

Figure 14:
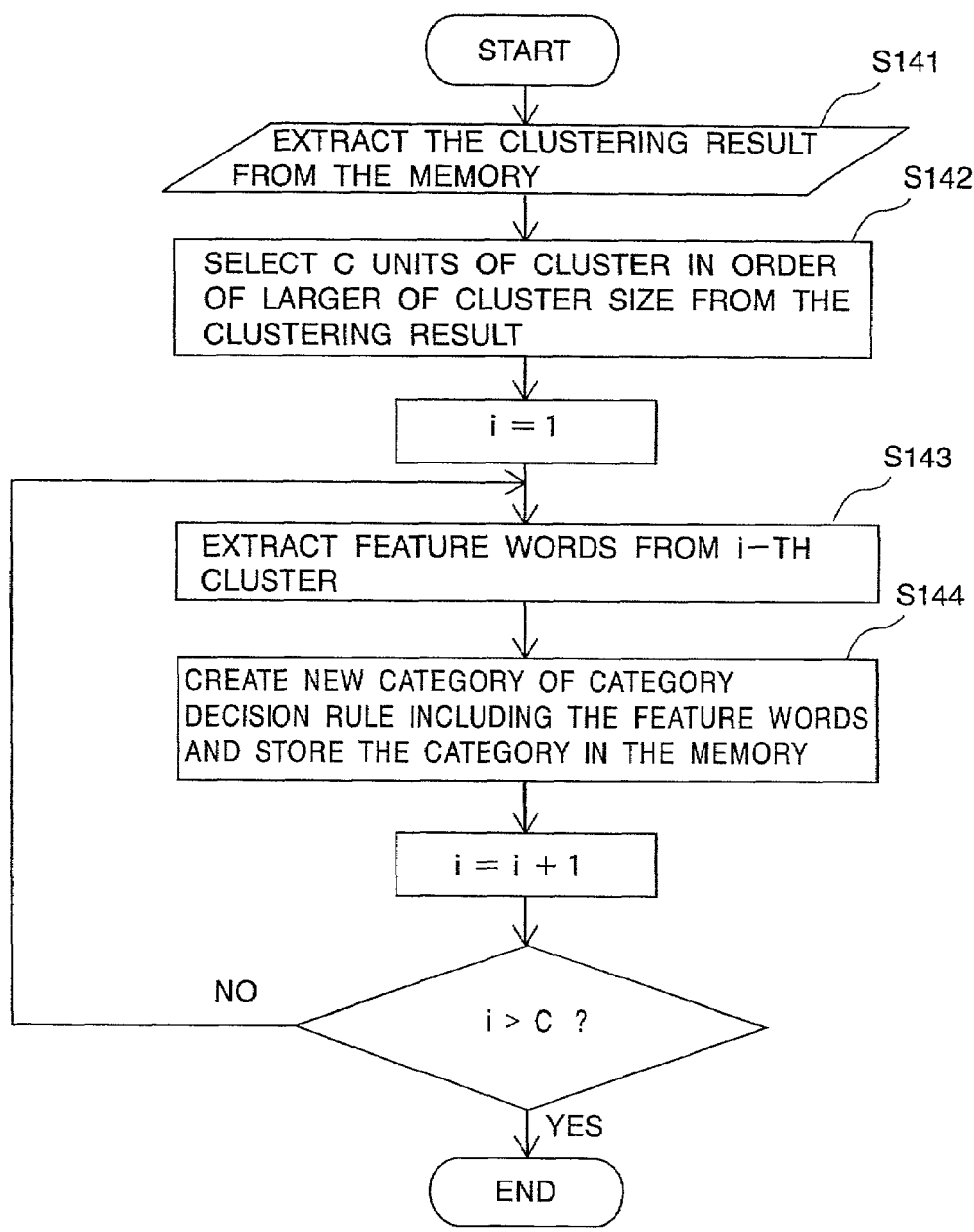
FIG. 14 is a flow chart of processing to automatically create a new category of the control unit 14 according to a fourth embodiment of the present invention.

FIG. 14 is a flow chart of processing in which the control unit 14 automatically creates a new category by referring to the clustering result. First, the control unit 14 extracts the clustering result of texts unclassified to any category from the memory 13 (S141), and selects C units of clusters in order from the largest cluster size from the clustering result (S142). The cluster size is represented as the number of texts included in the cluster. Then, the control unit 14 extracts feature words of each cluster (S143), and creates a new category of category decision rule including the feature words as shown in FIG. 3 (S144). This new category of category decision rule is stored in the memory 13. For example, as a method for extracting feature word of cluster, statistic quantity (offer weight) is calculated for all words in all texts of the cluster. The statistic quantity (offer weight) is disclosed in "Robertson, S. E. et al.: Simple, Proven Approaches to Text Retrieval, Computer Laboratory, University of Cambridge (1994)". In this reference, the statistic quantity is represented as follows.

$$\text{Offer weight} = rdf * \log ((rdf+0.5)(C-df-R+rdc+0.5)/(R-rdc+0.5)(df-rdf+0.5))$$

C: the number of all texts in the clustering result
R: the number of texts in the cluster (cluster size)
df: the number of texts including the word in all texts
rdf: the number of texts including the word in the cluster After the statistic quantity of each word is calculated, a predetermined number of words are selected in order of larger value of the statistic quantity.

In the fourth embodiment, a method for extracting feature words is not limited to the above-mentioned method. For example, a word commonly included in all texts of the cluster may be selected as the feature word.

Figure 15:
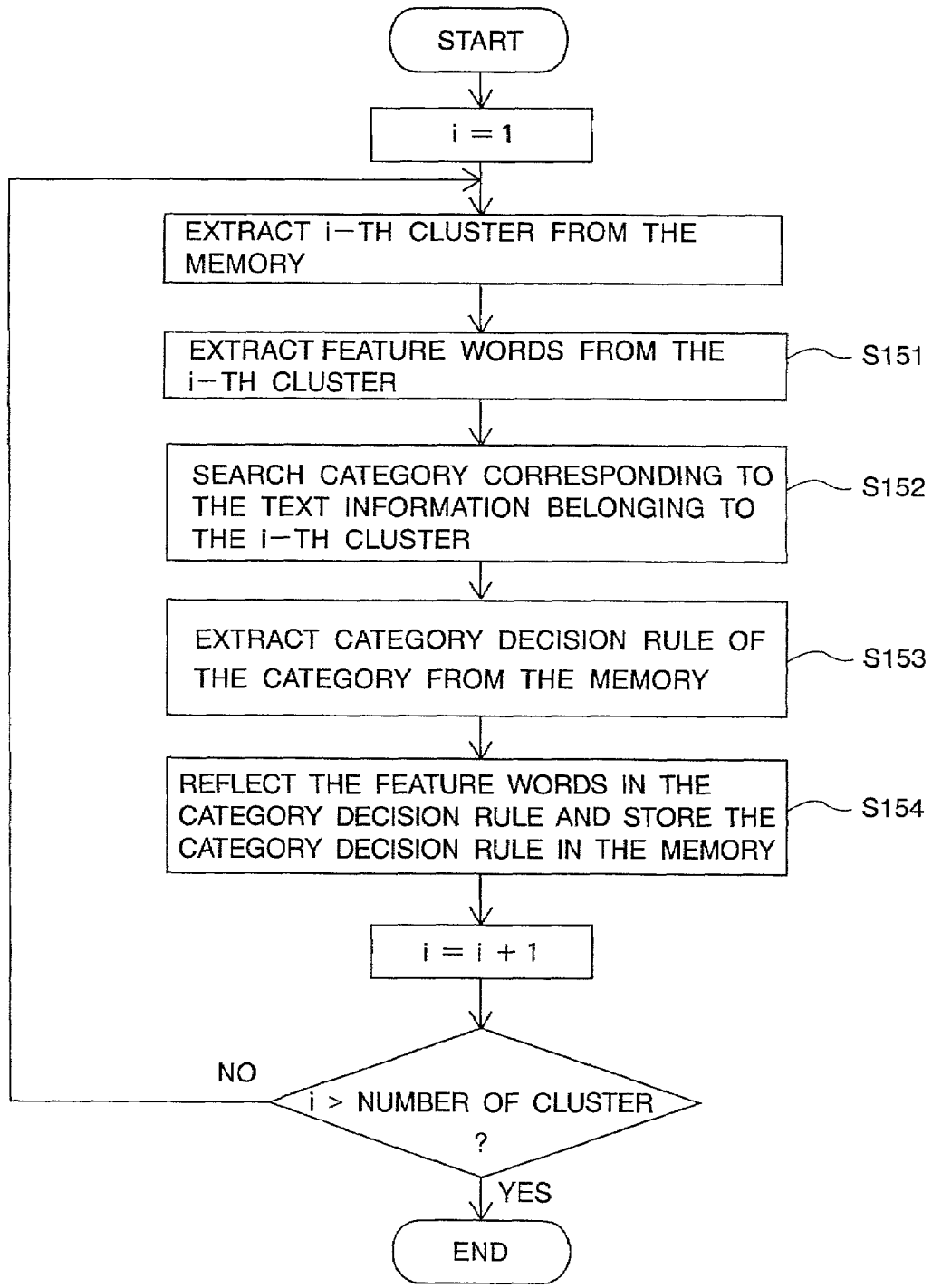
FIG. 15 is a flow chart of processing to automatically correct the category decision rule of the control unit 14 according to the fourth embodiment of the present invention.

In the fourth embodiment, the case of creating new category is only explained. In addition to this, the category decision rule of the existing category is automatically corrected. FIG. 15 is a flow chart of processing of the control unit 14 for automatically correcting the category decision rule of the existing category. First, the control unit 14 extracts feature words of each cluster by above-mentioned method (S151), and decides category corresponding to text belonging to the cluster (S152). For example, in FIG. 9, assume that the feature words are extracted from the cluster consisting of texts 1, 4, 6. Two (texts 1, 4) of these three texts (texts 1, 4, 6) belong to category 1. Accordingly, the category corresponding to the cluster is regarded as category 1. Next, the control unit 14 corrects the category decision rule of the category using the feature words of the cluster. For example, in FIG. 9, the feature words of cluster consisting of texts 1, 4, 6 are added to the category decision rule of category 1 in FIG. 3. Hereinafter, text of which content is similar to text 6 can be classified to category 1.

Figure 16:
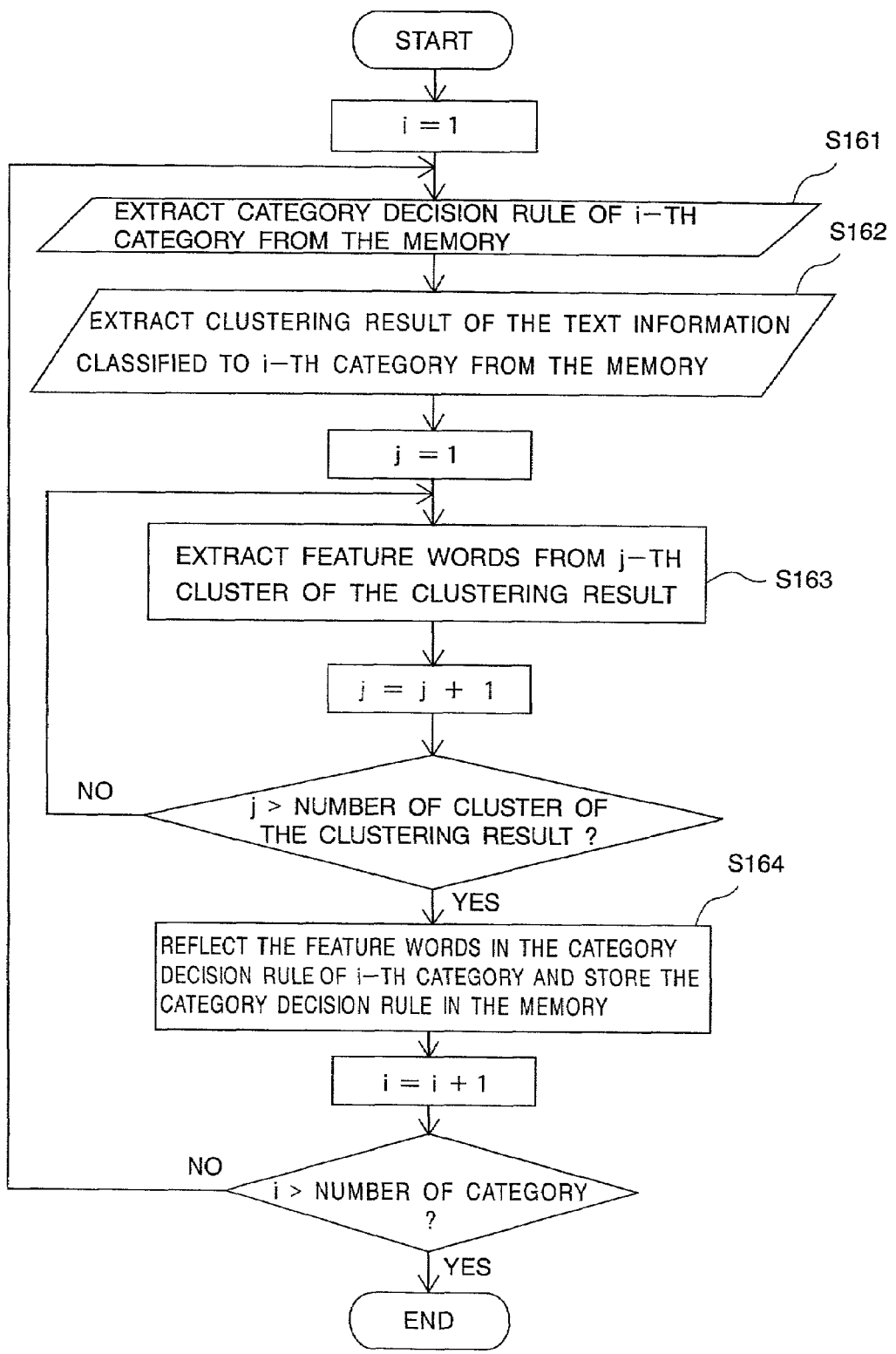
FIG. 16 is a flow chart of processing to automatically correct the category decision rule of the control unit 14 according to a first modification of the fourth embodiment of the present invention.

FIG. 16 is a flow chart of processing of automatic correction of the category decision rule of the existing category according to the first modification of FIG. 15. In the same way as in the second embodiment (FIGS. 10, 11), in case that category decision is firstly executed and clustering is executed for each category, this processing of the first modification is applicable. The control unit 14 executes the following processing for each category. First, the control unit 14 extracts a category decision rule and a clustering result of texts classified to a category of the category decision rule (S161, 162). Next, the control unit 14 extracts feature words from each cluster of the clustering result (S163), and corrects the category decision rule by using the feature words (S164). In FIG. 16, the feature words are extracted from all clusters belonging to the category. However, in the same way as in FIG. 14, C units of clusters are selected in order of larger cluster size, and the C units of clusters may be used as object of extraction of feature words.

Figure 17:
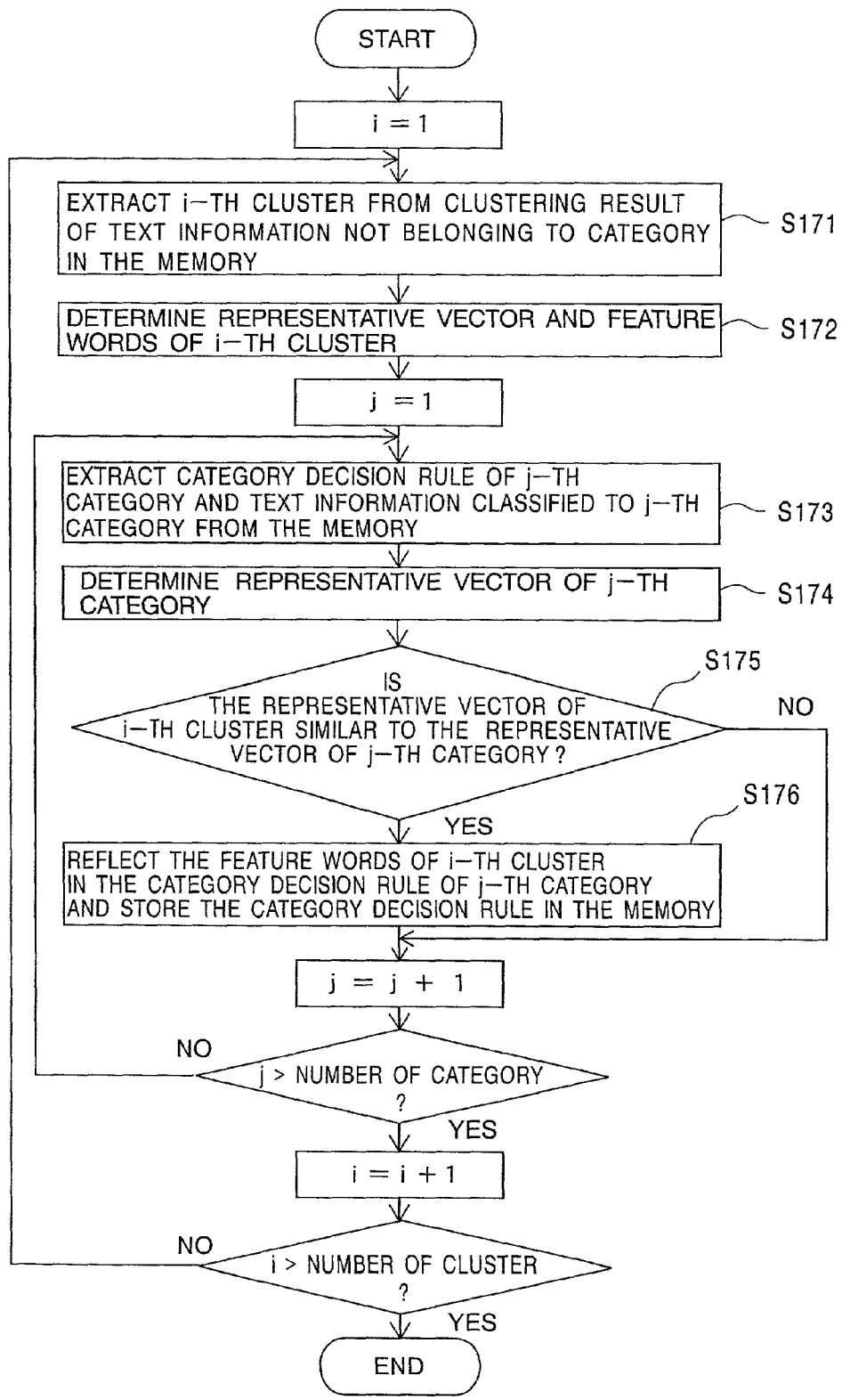
FIG. 17 is a flow chart of processing to automatically correct the category decision rule of the control unit 14 according to a second modification of the fourth embodiment of the present invention.

FIG. 17 is a flow chart of processing of automatic correction of the category decision rule of the existing category according to the second modification of FIG. 15. In the same way as in the third embodiment (FIGS. 12, 13), in case that clustering is executed for texts unclassified to any category, this processing of the second modification is applicable. The control unit 14 separately extracts a cluster from the clustering result of texts unclassified to any category (S171), and executes the following processing. First, the control unit 14 extracts feature words from the cluster and determines a representative vector using the feature words (S172, 173). For example, each text belonging to the cluster is morphologically analyzed and each feature word is extracted from the analyzed text. A frequency vector of each word is calculated for all texts, and an average of the frequency vector of each word for one text is calculated. The average of the frequency vector is used as the representative vector of the cluster. Next, the control unit 14 calculates a representative vector of each category (S174), and calculates a similarity degree between the representative vector of the cluster and the representative vector of each category. In the same way as the representative vector of the cluster, the representative vector of each category is calculated as an average of word frequency vector of each text belonging to the category. If the similarity degree (inner product, cosine) between the representative vector of the cluster and the representative vector of one category is above a threshold, the cluster is decided to be similar to the one category. In this case, the control unit 14 corrects the category decision rule of the one category using the feature words of the cluster (S176).

In the above-mentioned explanation, a new category is automatically created and the category decision rule of the existing category is automatically corrected. However, an interactive processing may be added. For example, candidates of feature words of a cluster may be presented for the user to select. Furthermore, the user may indicate whether a new category is created or whether the category decision rule is corrected.

As mentioned-above, in the text information analysis apparatus of the present invention, even if unknown text not classified to an existing category is input, the unknown text is quickly classified and arranged.

A memory device, such as a CD-ROM, floppy disk, hard disk magnetic tape, or semiconductor memory can be used to store instructions for causing a processor or computer to perform the processes described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A text information analysis apparatus for arranging a plurality of texts according to the content of each text, comprising:
   a category decision unit configured to classify text to one of a plurality of predetermined categories;
   a cluster generation unit configured to cluster texts having similar contents from the plurality of texts, the category decision unit and the cluster generation unit being configured to classify text and cluster texts, respectively, simultaneously; and
   a control unit configured to control said category decision unit to execute a category decision for the plurality of texts, and to control said cluster generation unit to execute clustering for at least texts not classified to any category in a category decision result.

2. The text information analysis apparatus according to claim 1, further comprising an input unit configured to input the plurality of texts, and
   wherein said control unit respectively supplies the plurality of texts input by said input unit to said category decision unit and to said cluster generation unit.

3. The text information analysis apparatus according to claim 2,
   wherein said control unit supplies the plurality of texts to said category decision unit first, and then supplies the texts classified to each category to said cluster generation unit in case of receiving the category decision result from said category decision unit.

4. The text information analysis apparatus according to claim 3,
wherein said control unit extracts a category decision rule of each category and the clustering result of the texts classified to the category from said memory, extracts feature words from the texts of each cluster of the clustering result, and stores the category decision rule including the feature words of corresponding cluster in said memory.

5. The text information analysis apparatus according to claim 2,
wherein said control unit supplies the plurality of texts to said category decision unit first, and then supplies the texts not classified to any category to said cluster generation unit in case of receiving the category decision result from said category decision unit.

6. The text information analysis apparatus according to claim 5,
in case of receiving the clustering result of the texts not classified to every categories from said cluster generation unit,
wherein said control unit selects a predetermined number of clusters in order of larger number of texts in each cluster from the clustering result, extracts feature words from the texts in the selected cluster, and stores a new category of which category decision rule includes the feature words of the selected cluster in said memory.

7. The text information analysis apparatus according to claim 5,
wherein said control unit extracts each cluster of texts not classified to any category, a category decision rule of each category, and texts classified to the category from said memory; extracts feature words from the texts of the cluster and feature words from the texts classified to the category; and stores the category decision rule including the feature words of the texts of the cluster in said memory if the feature words of the texts of the cluster are similar to the feature words of the texts classified to the category.

8. The text information analysis apparatus according to claim 1, further comprising a memory configured to correspondingly store a category decision result by said category decision unit and a clustering result by said cluster generation unit, and
an output unit configured to comparatively output the category decision result and the clustering result from said memory through said control unit.

9. The text information analysis apparatus according to claim 8,
wherein said control unit supplies the category decision result from said category decision unit to said output unit before said cluster generation unit completes clustering the plurality of texts.

10. The text information analysis apparatus according to claim 8,
wherein said output unit discriminatively displays the texts classified to a predetermined category in the category decision result and the clustering result.

11. The text information analysis apparatus according to claim 8,
wherein said control unit extracts feature words from texts in each cluster of the clustering result, extracts a category decision rule of the category classifying the texts in the cluster from said memory, and stores the category decision rule including the feature words of corresponding cluster in said memory.

12. A text information analysis method for arranging a plurality of texts according to the content of each text, comprising:
classifying text to one of a plurality of predetermined categories;
clustering texts having similar contents from the plurality of texts, the classifying text and the clustering texts being executed simultaneously;
controlling the classifying step to execute for the plurality of texts; and
controlling the clustering step to execute for at least texts not classified to any category in a category decision result.

13. The text information analysis method according to claim 12, further comprising:
correspondingly storing a category decision result and a clustering result in a memory, and
comparatively outputting the category decision result and the clustering result through a display.

14. The text information analysis method according to claim 13, at the outputting step, further comprising:
outputting the category decision result while simultaneously executing clustering of the plurality of texts.

15. The text information analysis method according to claim 13, at the outputting step, further comprising:
discriminatively displaying the texts classified to a predetermined category in the category decision result and the clustering result.

16. The text information analysis method according to claim 13, at the controlling step, further comprising:
extracting feature words from texts in each cluster of the clustering result;
extracting a category decision rule of the category classifying the texts in the cluster from said memory; and
storing the category decision rule including the feature words of corresponding cluster in said memory.

17. The text information analysis method according to claim 12, at the clustering step, further comprising:
clustering the texts classified to each category by unit of category.

18. The text information analysis method according to claim 17, at the controlling step, further comprising:
extracting a category decision rule of each category and the clustering result of the texts classified to the category from said memory;
extracting feature words from the texts of each cluster of the clustering result; and
storing the category decision rule including the feature words of the corresponding cluster in said memory.

19. The text information analysis method according to claim 12, at the clustering step, further comprising:
clustering the texts not classified to any category.

20. The text information analysis method according to claim 19, at the controlling step, further comprising:
extracting each cluster of texts not classified to any category, a category decision rule of each category, and texts classified to the category from said memory;
extracting feature words from the texts of the cluster and feature words from the texts classified to the category; and
storing the category decision rule including the feature words of the texts of the cluster in said memory if the feature words of the texts of the cluster are similar to the feature words of the texts classified to the category.

21. The text information analysis method according to claim 17,
at the controlling step, further comprising:
selecting a predetermined number of clusters in order of larger number of texts in each cluster from the clustering result;
extracting feature words from the texts in the selected cluster; and
storing a new category of which category decision rule includes the feature words of the selected cluster in said memory.

22. A computer readable medium for use with a computer, said computer readable medium comprising:
a computer readable program code embodied in said medium for causing said computer to arrange a plurality of texts according to the content of each text, said computer readable program code having:
computer readable program code to classify text to one of a plurality of predetermined categories;
computer readable program code to cluster texts having similar contents from the plurality of texts, the program code to classify text and the program code to cluster texts being performed simultaneously; and
computer readable program code to execute classifying for the plurality of texts; and
computer readable program code to execute clustering for at least texts not classified to any category in a category decision result.

* * * * *